Dec. 7, 1926.
E. S. CLARK
1,610,040
TRANSMISSION MECHANISM
Filed Nov. 10, 1925    2 Sheets-Sheet 1
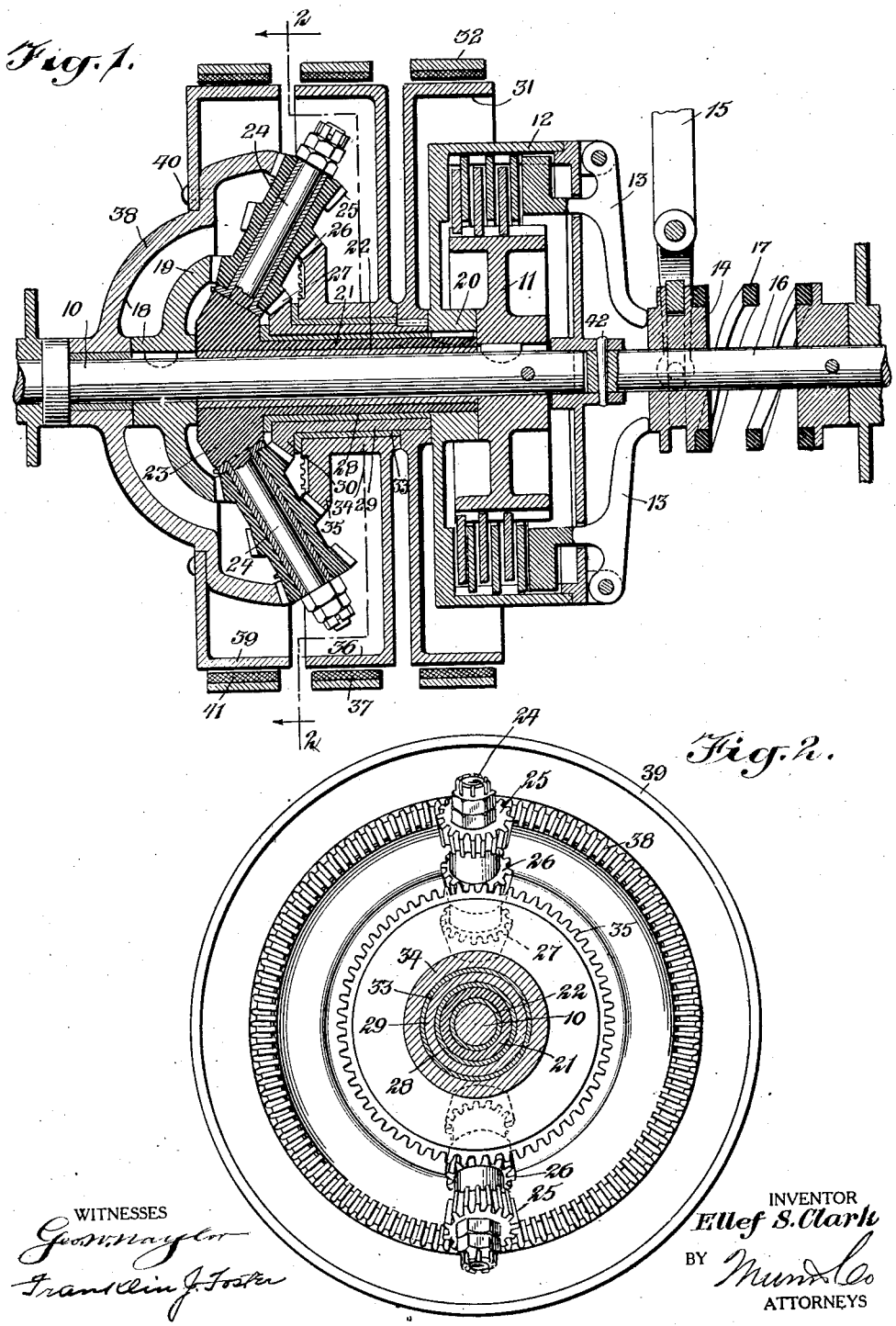

Dec. 7, 1926.
E. S. CLARK
1,610,040
TRANSMISSION MECHANISM
Filed Nov. 10, 1925
2 Sheets-Sheet 2

WITNESSES

INVENTOR
Ellef S. Clark
BY
ATTORNEYS

Patented Dec. 7, 1926.

1,610,040

UNITED STATES PATENT OFFICE.

ELLEF S. CLARK, OF ROYAL OAK, MICHIGAN.

TRANSMISSION MECHANISM.

Application filed November 10, 1925. Serial No. 68,183.

The present invention relates to a change speed transmission mechanism capable of a wide range of utility, but in its preferred form primarily adapted for transmitting power from the crank shaft of an automobile engine to the propeller shaft of the car.

An object of the invention is to provide a planetary transmission which in its preferred embodiment is capable of being operated by a standard gear shift lever, and which like standard sliding gear transmissions, which are now so operated, will give three speeds ahead and one speed in reverse.

The advantages of planetary gear transmission over the commonly used sliding gear transmission are well recognized. Planetary transmission avoids clashing of gears, inasmuch as gears are always in mesh, is much more suitable for operation by an unskilled driver, and has the great advantage that when the car is in high speed or direct drive, the gear set revolves as a unit with the fly wheel without any gears turning on each other, thus insuring a quiet drive with a minimum of friction.

The only type of planetary gear transmission mechanism which has been commercially used with any success, is the present type of Ford transmission, which is capable of giving only two speeds ahead and one speed in reverse. It has been heretofore considered impracticable to provide a planetary transmission giving three speeds ahead and one in reverse without rendering the mechanism unduly complicated. The two speed ahead type is only suitable for small light cars, and it is an object of the present invention to provide a three speed ahead type which will be of simple, practical construction, and which is primarily intended for superseding the usual sliding gear transmissions used on large and heavy cars.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in longitudinal section through a transmission mechanism embodying the invention.

Fig. 2 is a transverse sectional view on the line 2—2 of Fig. 1.

Figure 3:
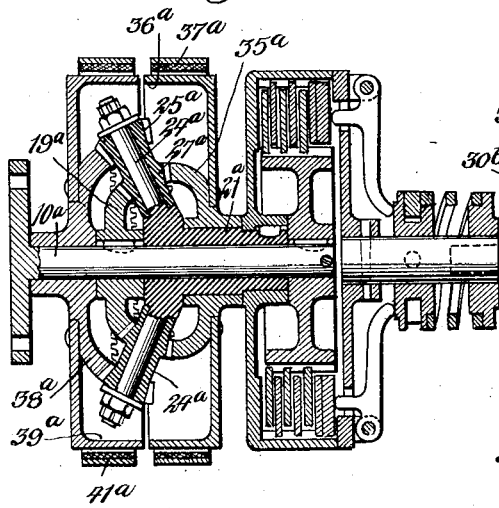
Figs. 3, 4 and 5 are longitudinal sectional views through modified types of transmissions.

I shall first refer to the mechanism shown in Figs. 1 and 2, inasmuch as this mechanism not only illustrates the novel principles involved, but shows a preferred form of transmission for ordinary automobile purposes. In these figures I have used the reference character 10 to designate the rear end of a crank shaft or motor shaft. Keyed upon said shaft is the driving element 11 of a conventional type of disc clutch, said clutch including a driven element 12, operating levers 13 for engaging the driving and driven elements, a clutch collar 14 for actuating the levers, and a control lever 15 for the clutch collar.

The control lever may be pedal operated or otherwise suitably manipulated by the driver of the car. The collar 14 is slidably mounted upon the usual propeller shaft 16 in a conventional manner, and a spring 17 encircling the propeller shaft or driving shaft 16 normally tends to urge the collar 14 forwardly and engage the clutch. The motor shaft 10 has the hub 18 of a driving gear 19 keyed thereto, the gear 19 being preferably bevelled. The hub 20 of the driven element 12 of the clutch, is keyed to a hollow driven shaft 21 turning freely on the motor shaft 10. The hollow shaft 21 is preferably lined with suitable bearing material 22. It will be understood that any suitable type of roller bearings might be employed instead of the hardened bushings or bearing sleeves illustrated in Fig. 1.

Near its forward end, the driven shaft 21 carries means for supporting and retaining one or more sets of planetary gears. I have shown a simple form of gear retaining mechanism, or planetary gear carrier including an enlarged head 23 on the shaft 21 from which project a suitable number of radially disposed spindles 24. Preferably a balanced spindle arrangement is used, two spindles at diametrically opposite points of the head 23 ordinarily serving the purpose. A greater number of spindles may be employed if desired, but in most instances the additional balance and interlocking gained, will not justify the added complication of the construction. Upon each spindle there is mounted a set of planetary gears or pinions 25, 26, 27. These gears are fixed together for simultaneous free turning on the spindles 24, and may if desired, be integral with each other as shown.

Turning freely on a bearing sleeve 28 which encircles the driven shaft 21, is a hollow shaft 29, provided at its forward end with a bevel gear 30. Bevel gear 30 and the bevel driving gear 19 are always in mesh with the innermost gears 27 of the spindle sets. It is necessary to provide some means for optionally holding the gear 30 against rotation. With this end in view I may conveniently key the hub of a brake drum 31 to the hollow shaft 29, this drum being encircled by a brake band 32 operated in any convenient manner (not shown) to grip the drum and lock the shaft 29 and its associated gear 30 against rotation. A bearing sleeve 33 encircling the hollow shaft 29 is surrounded by another hollow shaft 34 carrying a bevel gear 35 meshing with the planetary gears 26. Shaft 34 preferably forms the hub of a brake drum 36 similar to drum 31, and encircled by an associated brake band 37.

Turning freely on the motor shaft 10 is a relatively large reverse gear 38, the hub of this gear turning on the shaft 10 at a point between the driving gear 19 and the motor. The gear 38 is bevelled for engagement with the outer pinions 25 of the planetary set, and may have a brake drum 39 bolted thereto as at 40, and encircled by brake band 41.

It will be noted that the spindles which carry the planetary gear sets are inclined rearwardly or in a direction away from the motor. This inclination will depend entirely upon the speed ratios which it is desired to establish between the motor shaft and propeller shaft, and upon the relative sizes of the driving gear 19 and sun gear 30. If the speed ratio at the intermediate speed is to be two to one, the spindles 24 would be disposed at right angles to the motor shaft, and the gears 19 and 30 would be of equal size as will be readily understood. For speed ratios of less than two to one, the spindles will incline in the direction shown in Fig. 1; while for speed ratios greater than two to one, they would incline in the opposite direction or toward the motor. An advantage of the spindle inclination is that fewer gears may be used than otherwise possible to obtain the desired speed ratio, consequently the construction is simplified. The inclined spindles necessitate the use of bevel gears for coaction with the planetary pinions, thereby obtaining a more positive intermesh, a better balancing, and a more compact structure. It may be noted that the bevel gears at each side of the spindles are dished and in effect nested to render the structure compact.

Figure 4:
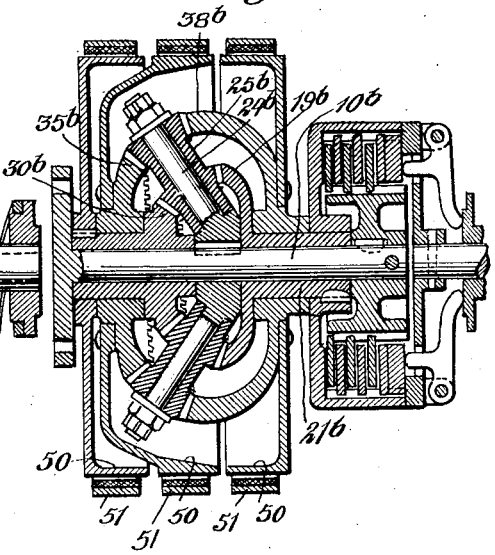
Figure 5:
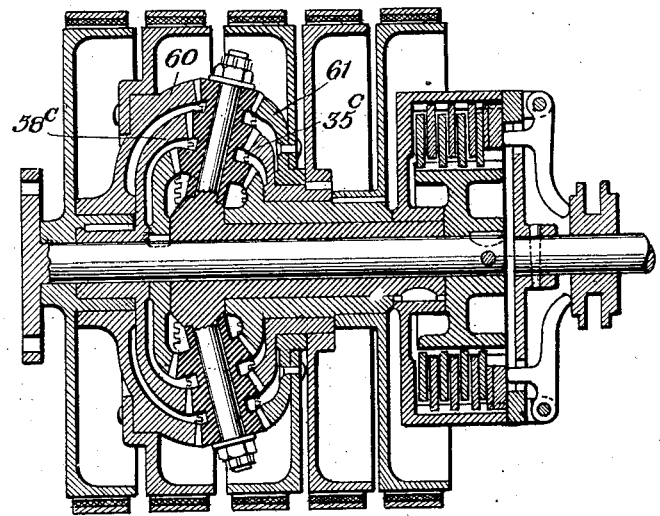

Before describing the modified types of transmission shown in Figs. 3 to 5, it may be well to briefly summarize the operation of the prefererd type of transmission shown in Figs. 1 and 2.

When the engine is idling, and the clutch 11, 12 is out, and all of the brake bands are out of engagement with their associated drums, the drive shaft 10 and the driving gear 19 carried thereby, are rotating. The planetary gear sets are rotating on their spindles and idly driving gears 30, 35 and 38, the driven shaft 21 loaded by the vehicle, remaining stationary. To put the mechanism in slow speed, brake band 37 is applied to the drum 36, locking the gear 35 against rotation. The clutch is still out. The intermeshing engagement of the planetary gears 26 with the gear 35 will cause planetary movement of the gear sets and their spindles and consequent rotation of the driven shaft 21 to overcome its load and drive through the clutch member 12 to the propeller shaft 16. The pin connection which I have illustrated at 42 between the member 12 and the propeller shaft is of course, merely diagrammatic and subject to considerable change.

To obtain an intermediate speed, the drum 36 is released and the brake band applied to the drum 31, locking gear 30 against movement. This causes a similar action to take place. Planetary gear sets travel around the sun gear 30, which being smaller than the gear 35 will result in a higher speed being imparted to the driven shaft 21. At both the slow speed and the second or intermediate speed, all of the gears which are not directly connected with the gear 19, are turning idly under the influence of the planetary gears with which they are in mesh.

At high speed I drive directly through the clutch 11, 12, all of the brake bands being released and the clutch being thrown in to directly couple the motor shaft 10 and propeller shaft 16. At high speed, which is the speed commonly used, both the planetary gears and the sun gears rotate as a unit with the motor shaft. This gear assembly assures an additional fly wheel effect on the motor, and the entire assembly turns without any of the gears turning one upon the other. At high speed therefore, the drive is substantially frictionless as compared to the sliding gear transmission in which some intermeshing gears are turning on each other at all speeds of the engine.

The operation of the reverse gear 38 will be evident. With the clutch out, brake band 41 is applied, holding gear 38 stationary and causing the planetary gear sets and their associated spindles to rotate about gear 38 and turn the driven shaft 21 in a reverse direction. It will be noted that I may follow the usual practice and make the reverse speed the lowest speed of all, whereby a maximum of power is obtained on the reverse. It will be evident however that even if low speed and reverse speed were similar, gear 38 would still be larger than gear 35, since drive gear and reverse gear rotate in the same direction in which the planetary gears revolve; while the opposite is true relative to the low speed gear. Therefore, they would give entirely different speed ratios between low speed and reverse gears even if these gears were of equal size (assuming all of the planetary gears to be of equal size).

In Fig. 3 I have shown a preferred arrangement of gearing for obtaining two speeds forward and one speed in reverse. It will be noted that the construction is generally similar to the construction of Fig. 1. In this figure however, I have shown the device on a smaller and more diagrammatic scale, and have omitted the shaft linings and bearing sleeves for the sake of clarity. In Fig. 3, $10^a$ indicates the motor shaft, and $19^a$ the driving gear carried thereby. The hollow driven shaft $21^a$ carries the radially projecting spindles $24^a$ mounting planetary gear sets which include only two gears $25^a$ and $27^a$. High speed is obtained by a direct drive through the clutch mechanism of Fig. 1, and low speed is obtained by locking a sun gear $35^a$ against rotation. This sun gear has a bearing on the driven shaft $21^a$, and carries the usual brake drum $36^a$ encircled by operating band $37^a$. The reverse gear $38^a$ meshes with the gears $25^a$ of the planetary sets and carries a brake drum $39^a$ and associated band $41^a$. The gears $27^a$ of the planetary set mesh with the drive gear $19^a$ and low speed sun gear $35^a$.

For "two" speed engines, it is desirable that the slow speed ratio be greater than two to one, and with this end in view it will be noted that the spindles $24^a$ incline forwardly instead of rearwardly, and that the slow speed driven gear $35^a$ is larger than the driving gear $19^a$. This arrangement greatly increases the slow speed ratio shown in Fig. 1. The operation of the device will be evident from the previously discussed operation of the "three" speed type of gear set. Holding either brake drum $36^a$, $39^a$ against movement will cause the planetary system to rotate about the sun gear locked by the drum.

I have not shown any of the details of the control mechanism by which the driver regulates the application of the brake bands to selectively change speeds. It may be noted however, that with the type of transmission shown in Fig. 3, the brake bands may be controlled by foot pedals as in the ordinary Ford construction. In the types of transmissions using three or more speeds ahead, the control is preferably effected through a conventional type of gear shift lever, such as is employed in cars using a standard shift. It will be obvious however, that the method and means for applying the brakes forms no part of the present invention, and that a wide variety of operating means might be utilized.

In Fig. 4 I have shown a gear set or transmission mechanism for giving three speeds ahead and one in reverse, but in this instance the spindles $24^b$ and their associated gear sets $25^b$ are carried by and rotate with the motor shaft $10^b$ instead of carried by the driven shaft. The spindles and their gears thus act as driving, instead of power transmitting elements. The driven shaft $21^b$ carries a driven gear $19^b$. I provide the low speed gear $30^b$, the intermediate speed gear $35^b$ and the reverse gear $38^b$. The gears $30^b$, $35^b$, $38^b$ carry associated brake drums 50 for co-operation with brake bands 51, and locking any of the gears against rotation will impart movement to the driven gear $19^b$ to transmit power to the propeller shaft in accordance with the ratio of the locked gear and the driven gear.

The showing of Fig. 5 is in all respects similar to the transmission mechanism of Fig. 1, except that I have added an additional reverse gear 60, and an additional speed gear 61. The reverse gear 60 gives a reverse speed lower than the reverse gear $38^c$, while the additional gear 61 gives lower speed than the low speed obtained through gear $35^c$. Inasmuch as the mechanism of Fig. 5 operates on the same principle as that shown in Fig. 1, no detailed description thereof is believed necessary. This mechanism is peculiarly adapted for heavy work where more than three speeds ahead are desirable.

It will of course be evident that the gear designs might be so modified as to give a super speed ratio, that is to say, a higher speed ratio than is obtainable on a direct drive. For all ordinary purposes such a speed ratio would not be desirable inasmuch as I desire to eliminate friction as far as possible at the high speed.

It will be noted that I may obtain any number of reverse speeds up to two, and any number of ahead speeds up to four, without unduly complicating the construction of the apparatus, since the radial spindle arrangement makes it practicable to compound the gears without materially complicating the construction. The arrangement of the radial spindles which carry the planetary gear sets is such, that the mechanism is always evenly balanced.

As indicative of the simplicity of the invention, reference may be had to the two speed set of Fig. 3, in which it will be noted that only seven gears are employed.

The arrangement which requires the spindles to be inclined either forwardly or rearwardly rather than at right angles to the motor shaft; minimizes the number of gears necessary to effect proper operation, simplifies the construction, consequently reducing the cost of manufacture, and adding to the efficiency of the transmission.

Various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims. Among these I particularly wish to mention the means for controlling the sun gears, 30, 35, 38, etc. While for the sake of clarity of description only plain drums and associated brake bands have been mentioned herein and shown in the drawings, it is to be understood that I do not limit the mechanism to this particular form of brake, but that any suitable form of friction brake may be used, such as the single disc, multiple disc, cone-type, internal expanding type, plain brake shoe type, or any other well known form.

I claim:—

1. The combination with a driving shaft and a driving gear rigidly secured thereto, of a loaded hollow driven shaft turning freely on the drive shaft, a plurality of spindles fixed to and projecting radially from the driven shaft, sets of rigidly connected planetary gears turning freely on the spindles, one gear of each set meshing with the driving gear, a plurality of different sized sun gears mounted to turn freely about the axis of the driving shaft, said sun gears meshing with the gears of the planetary sets and normally idling as the planetary sets are rotated by the driving gear, and means for selectively holding any sun gear against movement to effect planetary movement of the planetary sets and their spindles, and consequent rotation of the driven shaft by which the spindles are carried, a clutch mechanism for directly coupling the drive shaft and driven shaft, whereby the driving gear, planetary gears, and sun gears will be locked against turning movement relattive to each other, and will rotate as a unit with the drive shaft.

2. The combination with a drive shaft and a driving gear rigidly secured thereto, of a loaded hollow driven shaft turning freely on the drive shaft, a plurality of spindles carried by, and projecting radially from the driven shaft, axes of said spindles being inclined relative to the axis of their supporting shaft, sets of rigidly connected planetary gears turning freely on the spindles, one gear of each set meshing with the driving gear, a plurality of sun gears of various sizes mounted to turn freely about the axis of the driving shaft, and disposed on opposite sides of the spindles, said sun gears meshing with the gears of the planetary sets, means for selectively holding any sun gear against movement to effect planetary movement of the planetary sets and their spindles, and rotation of the driven shaft in a direction depending upon the side of the spindles on which the locked sun gear is disposed, a clutch mechanism for directly coupling the drive shaft and driven shaft, whereby the driving gear, planetary gears and sun gears will be locked against a turning movement relative to each other, and will rotate as a unit with the drive shaft.

ELLEF S. CLARK.